(12) United States Patent
Baumann et al.

(10) Patent No.: US 7,537,540 B2
(45) Date of Patent: May 26, 2009

(54) ELECTRIC MOTOR DRIVEN SCREW DRIVING OR DRILLING TOOL DEVICE WITH PLANETARY GEAR

(75) Inventors: Martin Baumann, Esslingen (DE); Christoph Maier, Notzingen (DE)

(73) Assignee: Metabowerke GmbH, Nuertingen (DE)

( * ) Notice: Subject to any disclaimer, the term of this patent is extended or adjusted under 35 U.S.C. 154(b) by 380 days.

(21) Appl. No.: 11/595,890

(22) Filed: Nov. 13, 2006

(65) Prior Publication Data
US 2007/0114050 A1 May 24, 2007

(30) Foreign Application Priority Data
Nov. 18, 2005 (EP) .................. 05025222

(51) Int. Cl.
*F16H 35/10* (2006.01)
(52) U.S. Cl. ............... 475/263; 475/257; 475/264; 475/265; 475/317; 192/56.1; 192/223.2; 173/216
(58) Field of Classification Search .......... 475/254, 475/257, 263, 264, 265, 317; 192/56.1, 223.2; 464/35, 37; 173/20, 171, 178, 216, 48; 188/31, 188/30, 166
See application file for complete search history.

(56) References Cited

U.S. PATENT DOCUMENTS 4,448,098 A  5/1984  Totsu
4,892,013 A * 1/1990 Satoh .................. 475/266
5,692,575 A * 12/1997 Hellstrom ............ 173/216
5,897,454 A * 4/1999 Cannaliato .......... 475/265
6,523,658 B2 * 2/2003 Furuta et al. ........ 192/56.61

FOREIGN PATENT DOCUMENTS

DE    36 36 301   4/1988
EP    1 391 269   2/2004

* cited by examiner

*Primary Examiner*—David D. Le
(74) *Attorney, Agent, or Firm*—Paul Vincent

(57) ABSTRACT

An electric motor-driven screw driving or drilling tool device with a planetary gear, comprising a ring gear and planet wheels mating with the ring gear, wherein the ring gear can be locked and fixed relative to the housing via locking bodies which are pretensioned by springs in a radially inward direction, the locking bodies being radially outwardly displaceable when a switch-off torque has been exceeded, such that the ring gear can be rotated relative to the housing, and the drive shaft is no longer driven. In order to improve the ease of operation of the device and reduce its size, the invention proposes leaf springs which extend in the peripheral direction of the ring gear, whose lever arm lengths can be adjusted in a peripheral direction to generate different bending forces acting on a respective locking body.

12 Claims, 2 Drawing Sheets

ELECTRIC MOTOR DRIVEN SCREW DRIVING OR DRILLING TOOL DEVICE WITH PLANETARY GEAR

This application claims Paris Convention priority of EP 05 025 222.0 filed Nov. 18, 2005 the complete disclosure of which is hereby incorporated by reference.

BACKGROUND OF THE INVENTION

The present invention concerns an electric motor-driven screw driving or drilling tool device with a planetary gear, comprising a ring gear and planet wheels mating with the ring gear, wherein the planet wheels are driven to roll on the ring gear and have axles which drive a drive shaft, and with a torque adjusting means, wherein the ring gear can be locked such that it is fixed relative to the housing via locking bodies which are pretensioned in a radially inward direction by springs, and the locking bodies can be displaced in a radial outward direction when a switch-off torque has been exceeded, such that the ring gear can rotate relative to the housing, and the drive shaft is no longer driven.

A screw driving tool device of this type is disclosed in EP 1 391 269 A2. The plurality of locking bodies of this conventional screw driving tool device are pressed radially inwardly into depressions in the ring gear via an inclined surface arrangement on a bearing ring. The bearing ring is axially pretensioned by helical springs. The inclined surface arrangement deflects this axial pretension into a radially inward component. In order to adjust the maximum torque, an adjusting ring and thereby also the bearing ring are rotated such that another inclination of the inclined surface arrangement cooperates with the locking bodies, to produce a different radial force component, wherein the balls displace the inclined surface arrangement and the bearing ring against the spring force. In order to adjust this maximum torque, the user must disadvantageously perform an adjusting motion against the spring force.

U.S. Pat. No. 4,448,098 discloses an electric motor-driven screw driving tool device, also comprising a planetary gear means and a torque adjusting means. This torque adjusting means has one single locking body which is pretensioned in a radially inward direction by a spring, and locks a ring gear such that it is fixed relative to the housing when the drive is coupled. The single locking body is pretensioned by a leaf spring which extends in an axial direction, wherein the pretension of the leaf spring can be adjusted by a slider which can also be moved in an axial direction for this purpose. The torque adjusting means therefore disadvantageously requires a large amount of space in the axial direction. Another disadvantage is that the ring gear of the conventional screw driving tool device can be fixed relative to the housing only by one single locking body which must therefore adopt and transmit correspondingly large clamping forces, leading to increased wear.

It is the underlying purpose of the present invention to improve a screw driving tool device of the above-mentioned type to facilitate handling thereof, reduce the required space, and increase the wear resistance.

SUMMARY OF THE INVENTION

This object is achieved in accordance with the invention in a screw driving tool device of the above-mentioned type in that leaf springs are provided which extend in the peripheral direction of the ring gear, whose lever arm length can be adjusted in the peripheral direction to generate different bending forces which act on a corresponding locking body.

Since each locking body is associated with a leaf spring which extends in the peripheral direction, a maximum torque can be proportionally distributed among several locking bodies, and a corresponding deflecting force to be overcome by the locking body can be adjusted for each locking body by adjusting the lever arm length, and thereby a maximum torque on a tool drive shaft. This requires, however, only minimum axial space. The torque can be preselected using nearly no force, since the lever arm length can be varied through rotating an adjusting element, which defines the pivot point for the respective leaf spring, in the peripheral direction. Adjustment of the torque requires no substantial adjusting force, which would be demanding and undesirable or at least inconvenient for the user.

The leaf spring is moreover advantageously disposed radially outside of a ring or flange, which is fixed relative to the housing, and can be pressed directly against it for adjusting the lever arm length. This ring or flange, which is fixed relative to the housing, may advantageously be continuous in the peripheral direction, but has passage openings for the locking bodies. In this case, the ring gear is coupled via the locking bodies to the ring or flange, which is fixed relative to the housing during transmission on a tool drive shaft or spindle, such that the planet wheels mate with the inner toothing and drive a drive shaft or spindle.

The torque is advantageously adjusted by providing a control element radially outside of the leaf springs. This may advantageously be an adjusting ring which surrounds a neck of the screw driving or drilling tool device and can be rotated relative to the housing. The control element or the adjusting ring is then preferably directly coupled to the leaf springs. It exerts a radial inward pressure against the leaf springs, thereby determining their lever arm length.

A radially inwardly protruding projection of the control element or the adjusting ring thereby advantageously exerts a force onto a respective leaf spring.

In another advantageous fashion, the control element can be rotated in the peripheral direction through 50° to 85°, in particular through 60° to 75°. The control element may moreover be advantageously adjustable via incremental locking positions. An inhibition, which can advantageously be overcome by a small force, is provided between these locking positions. This embodiment is preferable to an embodiment, wherein an, in particular, positive-locking engagement behind the control element in the respective locking position must be unlocked by operating a release element.

The control element, in particular, the adjusting ring, advantageously has an operating means which extends in a radially outward direction and can be manually grasped. This operating means may be a radially projecting pin or any conventional projection or, advantageously a gripping surface provided with slip-protection. When the control element is designed as an adjusting ring, the manually grippable operating means is advantageously formed by a slightly furrowed surface of the adjusting ring.

In accordance with a further, particularly preferred embodiment of the inventive tool device, the locking bodies can be locked in depressions of the ring gear, wherein a respective depression is limited on one side by an elevation protruding past the remaining outer periphery of the ring gear. This elevation is oriented in the peripheral direction such that it presses against the locking body during conventional right-hand drive of the drive shaft. The elevation thus delimits that flank of the ring gear depression which displaces the locking body in a radial outward direction when the torque is exceeded.

In a particularly advantageous fashion, the locking bodies are cylindrical, since in this case, in contrast to the use of locking balls, the load can be transferred in a linear instead of a punctiform fashion, which reduces wear.

In another advantageous fashion, the leaf springs have a trapezoidal shape in the unwound state, wherein the joint of the leaf spring comes to rest in the area of large width of the trapezoidal spring shape to adjust a high torque limit.

Further features, details and advantages of the invention can be extracted from the following claims, the drawing, and the following description of a preferred embodiment of the invention.

DESCRIPTION OF THE PREFERRED EMBODIMENT

Figure 1:
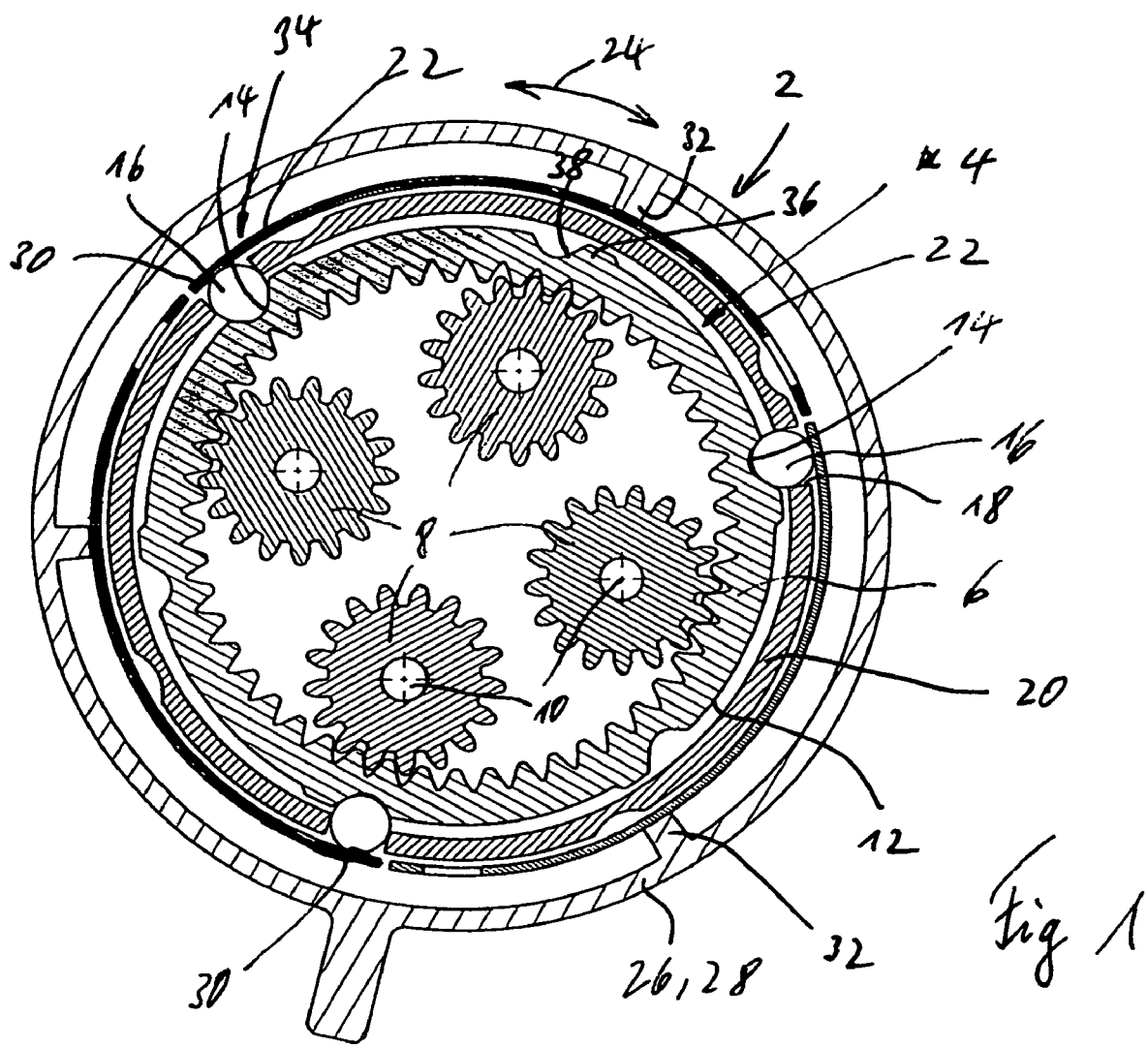
FIG. 1 shows a sectional view of a gear region of an inventive electric tool device with a sectional plane extending perpendicularly to the drive shaft.
Figure 2:
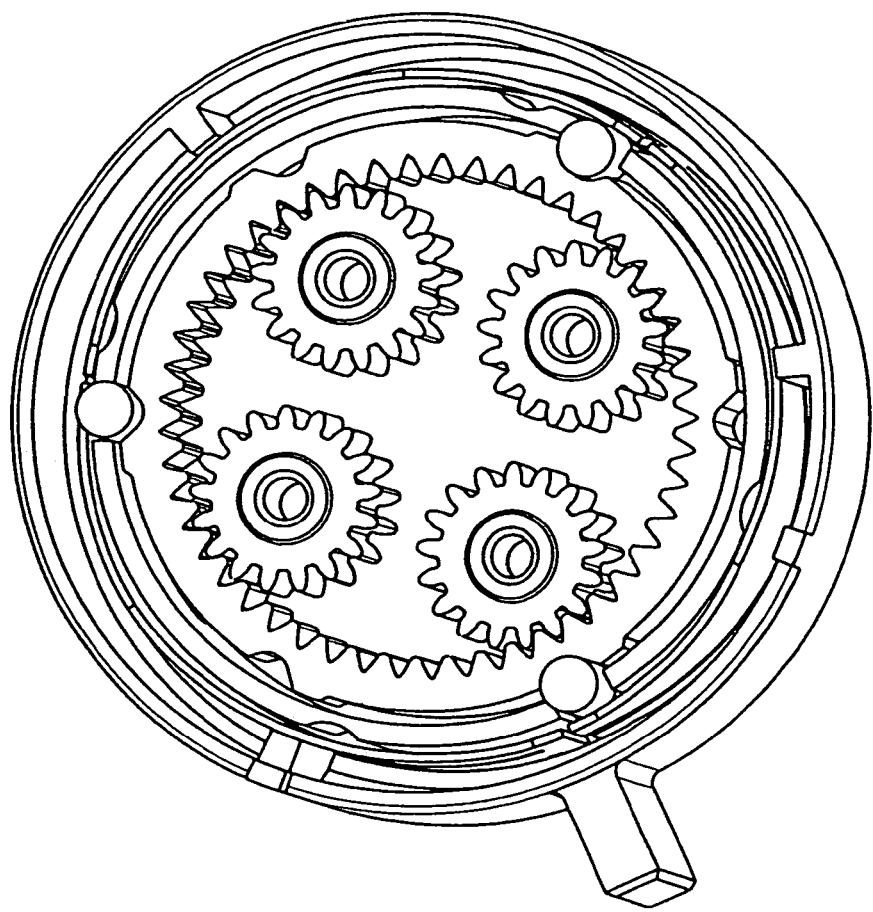
FIG. 2 shows a perspective view of the gear region in accordance with FIG. 1.

The figures schematically show a gear region of an electric motor-driven screw driving tool device or drilling tool. The gear region comprises a planetary gear 4 with a ring gear 6 and planet wheels 8 mating therewith, which can advantageously be rotationally driven by a common pinion (not shown) of the electric motor drive. The axles 10 of the planet wheels 8 are e.g. drivingly connected to a drive shaft (not shown) driving a tool or a tool chuck via a disk-shaped body. When the gear wheels 8 roll on the inner toothing of the ring gear 6, the axles 10 move about a circle, thereby driving the, in particular, disk-shaped coupling body and thereby the drive shaft. This is basically known in the art and therefore not shown in detail. The ring gear 6 is fixed relative to the housing during driving. Towards this end, the ring gear 6 has depressions 14 on its outer periphery 12, into which preferably cylindrical locking bodies 16 engage. The locking bodies 16 penetrate through radial passage openings 18 in a ring or flange, which is fixed relative to the housing and concentrically surrounds the ring gear 6, radially from the outside. When the ring gear 6 is fixed relative to the housing (shown in the figures), the ring gear is coupled to the ring or flange 20, fixed relative to the housing, via the plurality of (preferably three) locking bodies 16. The locking bodies 16 are pretensioned in a radially inward direction using leaf springs 22. These leaf springs 22 extend in the peripheral direction 24, i.e. concentrically to the ring or flange 20, which is fixed relative to the housing, and the ring gear 6. They are securely disposed via suitable means (not shown in the drawing) in the peripheral direction 24, and also in the radial direction between the ring or flange 20, which is fixed relative to the housing, and a control element 26, which is concentrically disposed radially outside of the leaf springs, and in the present case has the shape of a cylindrical adjusting ring 28. Each of the three leaf springs 22 abuts with one end 30 on a locking body 16 from a radially outer direction, pressing same in a radially inward direction. The radially inwardly protruding projection 32 of the control element 26 thereby presses against the respective leaf spring 22, thereby fixing the pivot point, to obtain an effective spring lever arm between this joint and the free end 30 of the respective leaf spring 22. The lever arm length can be varied through adjusting the control element 26 in the peripheral direction 24. The closer the control element 26 or its projection 32 is adjusted towards the free end 30 of a respective leaf spring 22, the shorter is the effective lever arm length of the leaf springs 22 and the higher is the force which acts radially inwardly on the respective locking body 16. The above-mentioned components thereby form a torque adjustment or delimiting means 34. When the respective projection 32 comes to rest radially outside of the respective locking body 16, torque limitation is almost deactivated, so that the locking bodies 16 can be released from the coupled position.

The torque adjusting means 34 is advantageously designed such that the torque can be limited continuously or in steps from e.g. 0.5 Nm (smallest torque limitation) to 8 Nm (largest torque limitation). Drilling operation with an overload protection of at least 40 Nm can also advantageously be realized.

The respective depression 14 is limited at one side by an elevation 36 which radially projects slightly past the remaining outer periphery of the ring gear 6. In this fashion, the flank 38 which abuts the respective locking body 16 is enlarged, such that the forces can be introduced into the locking body in a uniform fashion, thereby exerting little load on the surfaces and reducing wear.

As mentioned above, the planet wheels 8 are driven in the same direction via a pinion (not shown) of the electric motor during operation of the inventive screw driving and/or drilling tool device. The planet wheels 8 thereby roll on the inner toothing of the ring gear 6, wherein the ring gear 6 is adjusted via the locking bodies 16 on the ring or flange 20, which is fixed relative to the housing, in such a manner that it cannot rotate. In this fashion, the rotation of the axles 10 of the planet wheels is transferred to a drive shaft for a tool or a tool chuck via an, in particular, disk-shaped coupling element (not shown). The ring gear or its flanks delimiting the respective depressions 14 for the locking bodies 16 thereby abut on the respective locking body 16, producing a force which urges the respective locking body 16 in a radial outward direction. As long as this force is smaller than the radial inward force exerted on the locking bodies 16 by the leaf spring 22, the ring gear 6 cannot be rotated relative to the ring or flange 20, which is fixed relative to the housing. When the counter force exerted by the leaf springs 22 is exceeded, the locking body 16 is forced in a radial outward direction, out of the depression 14, and the ring gear 6 is rotated relative to the ring or flank 20, which is fixed relative to the housing, until it engages in the next depression 14 under the pressure of the leaf spring 22 or also overcomes this depression. In this fashion, the torque is limited, i.e. the torque exerted by the tool onto the workpiece.

Figure 3:
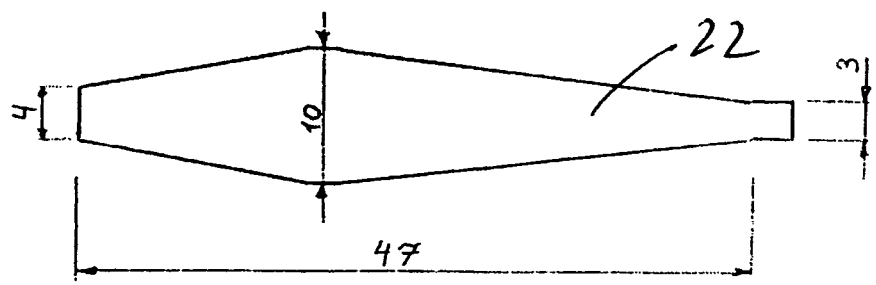
FIG. 3 shows a trapezoidal leaf spring of the gear region in accordance with FIGS. 1 and 2.

FIG. 3 shows an exemplary trapezoidal leaf spring 22.

We claim:
1. An electric motor-driven screw driving or drilling tool device having a housing and a drive shaft disposed within the housing, the device comprising:
    a planetary gear disposed within the housing, said planetary gear having a ring gear and planet wheels disposed within and cooperating with said ring gear, said planet wheels being driven to roll about said ring gear, said planet wheels having axles driving the drive shaft;
    locking bodies cooperating with an outer periphery of said ring gear to lock said ring gear relative to said housing, said locking bodies structured for outward displacement in a radial direction when a switch-off torque has been exceeded for thereby allowing said ring gear to rotate relative to the housing, wherein the drive shaft is no longer driven;

leaf springs extending in a peripheral direction of said ring gear to pretension said locking bodies in a radially inward direction; and means for adjusting a lever arm length of said leaf springs in a peripheral direction to generate differing bending forces acting on a respective locking body for torque adjustment.

2. The screw driving or drilling tool device of claim 1, wherein said leaf springs are disposed radially outside of a ring or flange, which is fixed relative to the housing, said leaf springs being urged directly against said ring or flange in order to adjust said lever arm length.

3. The screw driving or drilling tool device of claim 1, wherein said adjusting means comprises a control element disposed radially outside of the leaf springs to rotate relative to the housing.

4. The screw driving or drilling tool device of claim 3, wherein said control element comprises an adjusting ring.

5. The screw driving or drilling tool device of claim 3, wherein said control element exerts a radially inward force against said leaf springs to define said lever arm length.

6. The screw driving or drilling tool device of claim 3, wherein said control element has a radially inwardly protruding projection which exerts pressure on a respective said leaf spring.

7. The screw driving or drilling tool device of claim 3, wherein said control element can be rotated in said peripheral direction through 50° to 85°.

8. The screw driving or drilling tool device of claim 3, wherein said control element can be adjusted via incremental locking positions.

9. The screw driving or drilling tool device of claim 3, wherein said control element has an operating means which extends in a radial outward direction and for manual adjustment thereof.

10. The screw driving or drilling tool device of claim 1, wherein said locking bodies can be locked in depressions in said ring gear, wherein each depression is delimited at one side by an elevation which projects past an outer periphery of said ring gear.

11. The screw driving or drilling tool of claim 1, wherein said locking bodies are cylindrical.

12. The screw driving or drilling tool of claim 1, wherein said leaf springs have a trapezoidal shape in an unwound state thereof.

* * * * *